United States Patent
Amaike et al.

(10) Patent No.: US 6,340,275 B1
(45) Date of Patent: Jan. 22, 2002

(54) CHAMFERING METHOD

(75) Inventors: Katsuhiro Amaike, Aichi-ken; Yukiharu Tomita; Masahiro Nakayama, both of Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/468,424

(22) Filed: Dec. 21, 1999

(30) Foreign Application Priority Data

Jan. 8, 1999 (JP) ............................ 11-002993

(51) Int. Cl.$^7$ ................................ B23B 35/00
(52) U.S. Cl. ........................... 408/1 R; 408/3
(58) Field of Search ................. 408/1 R, 3

(56) References Cited

U.S. PATENT DOCUMENTS 5,759,140 A * 6/1998 Egbert .................. 408/1 R

FOREIGN PATENT DOCUMENTS

| JP | 218009 A | * 9/1987 | .............. 408/1 R |
|---|---|---|---|
| JP | HEI 3-281111 | 12/1991 | |
| JP | 189403 A | * 7/1992 | .............. 408/1 R |
| JP | HEI 6-055319 | 3/1994 | |
| JP | 198505 A | * 7/1994 | .............. 408/1 R |
| SU | 1493390 A | * 7/1989 | .............. 408/1 R |

* cited by examiner

Primary Examiner—Daniel W. Howell
(74) Attorney, Agent, or Firm—Kenyon & Kenyon

(57) ABSTRACT

A pin and an oil hole are modeled in an X, Y, and Z space (a three-dimensional coordinate system). Then, the model is cut with a plane which passes through a central axis of the hole and which includes a line normal to a tangent of the pin at a point at which the central axis of the oil hole and the surface of the pin (cylindrical surface) intersect. By this operation, shapes of the pin and the oil hole are recognized in two dimensions. Following this, a point of a chamfering drill is made to overlap the pin and the oil hole on a plane. Since a shape of the chamfering drill is already known, dimensions of a chamfered portion when viewed on said plane can be determined geometrically. Then, chamfering is performed with the chamfering drill kept at such an angle of inclination that desired dimensions of chamfer can be obtained on said plane.

14 Claims, 14 Drawing Sheets

CHAMFERING METHOD

INCORPORATION BY REFERENCE

The disclosure of Japanese Patent Application No. HEI 11-002993 filed on Jan. 8, 1999 including the specification, drawings and abstract is incorporated herein by reference in its entirety.

BACKGROUND OF THE INVENTION

1. Field of the Invention

The present invention relates to the method for chamfering a periphery of an opening of an inclined hole formed in a member, more specifically relates to the method for chamfering a periphery of an opening of an inclined hole having double angles (i.e. an inclined hole that is non-parallel to two or more reference axes of the member).

2. Description of the Related Art

Normally, when chamfering is performed on the inclined hole formed on a curved surface of the member, a shape of a chamfer varies according to a surface shape of the member, an angle of the hole, etc., and hence it is difficult to define its shape uniquely. Taking an oil hole of a crankshaft for example, a problem arising out of this fact will be explained below.

FIG. 16 and FIG. 17 are diagrams showing a crankshaft 1. Generally, an oil hole 3 for supplying lubricating oil is formed in a pin 2 of the crankshaft 1. This oil hole 3 pierces the pin 2 and an arm 6, running straight down to an oil hole 5 formed in a journal 4, and communicates with a middle part of the oil hole 5. FIG. 18A is an enlarged diagram showing only the pin 2 of the crankshaft 1. Also, FIG. 18B is a sectional view of the pin 2 being cut at connecting portion between the arm 6. As shown in the figures, if a shaft center of the pin 2 is set to be in the X axis direction and both the Y and Z axes are set so as to cross perpendicular to the X axis and also to each other, the oil hole 3 is non-parallel to the X axis and does not pass through an intersection of the Y axis and the Z axis (that is, the oil hole 3 is a hole non-parallel to radial direction of the pin). As described above, an inclined hole that is not parallel to two or more reference axes of the member is referred to as "an inclined hole having double angles" in the present description.

By the way, in a manufacturing process of the crankshaft 1, the crank shaft 1 is required to go through quenching to improve its mechanical characteristic. Typically, a quenching process is performed after the oil hole 3 is drilled. In this process, stress concentration occurs at the opening of the oil hole 3 and therefore problems such as a crack are apt to occur. In view of this, to prevent the occurrence of a crack, it is necessary to chamfer the opening of the oil hole 3 beforehand. A chamfer at the opening of the oil hole 3 is also necessary after the crankshaft 1 has been incorporated in an engine in order to improve the circulation of the lubricating oil etc. Therefore, if a chamfered portion of the oil hole 3 which was drilled before the quenching remains with necessary dimensions even when a grinding process after quenching has been completed, re-chamfering becomes unnecessary, hence being convenient.

Since the oil hole 3 is the inclined hole having double angles as described above, it appears as an opening of an elliptical shape on a cylindrical surface of the pin 2. If the chamfering operation is performed on this opening of the oil hole 3 with a shaft center of a chamfering drill brought in line with a central axis CL of the oil hole 3, a uniform chamfering all around the periphery of the opening cannot be done, rather the chamfer width becomes non-uniform, increasing or decreasing along the periphery all around (the term "uniform" means that "the chamfer width is uniform when viewed in an arbitrary direction"). Also, in laid-open Publication No. HEI 6-55319 of unexamined Japanese Patent Application, a technique is disclosed that a uniform chamfering is realized by adopting a method wherein the shaft center of the chamfering drill is brought in line with the central axis CL of the oil hole 3 and the shaft center of the drill is translated in parallel with respect to the central axis CL of the oil hole 3, by a prescribed amount. However, with the technique in concern, the chamfer width cannot be made uniform when viewed in an arbitrary direction. To prevent the occurrence of a crack in the quenching process, a minimum required chamfering width needs to be secured. Also, to retain the chamfered portion having necessary dimensions after the grinding process, a sufficient chamfer width must be secured in the chamfering operation before the quenching. Accordingly, in the conventional method, the chamfering drill is inserted into the member to a deeper position so that the chamfer width at a position where the chamfer width is smallest among non-uniform chamfer widths all around the periphery can be processed so as to have necessary chamfer dimension or more.

As described above, the conventional processing method involves chamfering in unnecessary widths as a whole, and this constraint becomes a cause which hinders realization of a small-sized, lightweight engine. This is because it is necessary to secure "a land width" for the pin 2 of the crankshaft 1. Here, the land width is a length of the pin 2 along the X axis necessary to secure an area of an oil film formed between the surface of the pin 2 and a crank pin metal (not shown in the figure). A land width greater than a certain value is necessary in preventing the occurrence of seizure etc. However, the oil hole 3 and chamfering portion thereof cannot be included into the land width. Therefore, a necessary dimension of the pin 2 along the X axis comes to the sum of a necessary land width, a diameter of the oil hole 3, and the chamfer dimension.

That is, as long as the conventional method for chamfering is employed, a sufficient value must be secured as the chamfer dimension from a design phase, which resulted in making the dimension of the pin 2 along the X axis longer. Then this method makes a total length of the crankshaft 1 increase, which results in an increase of a total length of an engine and augmentation of a weight of the engine.

As can be understood from the above, if controlling the chamfer width, namely chamfering a hole uniformly all around periphery thereof and the like, is possible, even for the oil hole 3 which is the inclined hole having double angles, it becomes unnecessary to secure chamfer dimension in excess, which will then bring about a large advantage in designing the engine, such as enabling reduction of the total length thereof etc.

SUMMARY OF THE INVENTION

The present invention has been made in view of the above-mentioned problem. Its object is to provide a method for chamfering the periphery of the opening of the inclined hole formed in the member, more specifically to provide a method for chamfering the inclined hole having double angles which can control the chamfer width on the periphery of the opening of the inclined hole.

A first embodiment according to the present invention for solving the above-mentioned problem is a method for chamfering the periphery of the opening of the inclined hole formed in the member, characterized in that an approach angle of the chamfering tool is calculated on a plane which passes through both the central axis of the above-described inclined hole and chamfering points and then chamfering is performed based on the calculation result.

In the present invention, when chamfering the periphery of the opening of the above-described inclined hole, relationships between a cross section of the above-described inclined hole as well as a surface shape of the above-described member and a tip end of the above-described chamfering tool are examined. Since a shape of the tip end of the chamfering tool is already known, a chamfer shape at the chamfering points can be determined geometrically on the above-described plane. Consequently, if the approach angle of the chamfering tool on the above-described plane is made to change, the chamfer shape can be directly controlled at the chamfering points, so that a necessary chamfer shape can be surely obtained.

Further, a second embodiment according to the present invention is a method for chamfering the periphery of the opening of the inclined hole having double angles formed in the member, comprising the steps of: modeling the above-described member and inclined hole thereof in a three-dimensional coordinate system; cutting off the above-described model with the plane which passes through both the central axis of the above-described inclined hole and the chamfering points; thereby recognizing the above-described member and the above-described inclined hole in two dimensions; determining the approach angle of the chamfering tool to obtain the desired chamfer shape by the use of the cross section of the inclined hole and a surface shape of the above-described member both of which have been projected on the two-dimensional plane; and performing the chamfering operation based on a result of the determination.

According to this construction of procedures, even an inclined hole having double angles can be recognized in two dimensions regarding the surface shape of the above-described member and the above-described inclined hole by cutting off the above-described model with the plane which passes through both the central axis of the above-described inclined hole and the chamfering points. Further, a shape of the tip end of the chamfering tool is overlapped to the cross section of the inclined hole and the surface shape of the above-described member both of which have been projected on the two-dimensional plane. Since the shape of the tip end of the chamfering tool is already known, the chamfer shape at the chamfering points can be determined geometrically. Consequently, if the approach angle of the chamfering tool is made to change on the above-described plane, the chamfer width at a point where control thereof is required can be directly controlled. By the way, since, in an initial phase of each of the above-mentioned processes, the above-described member and inclined hole thereof are modeled in a three-dimensional coordinate system and the model is cut, the position of the above-described plane can be grasped in the above-described three-dimensional coordinates. Therefore, the approach angle of the chamfering tool that is under examination on the above-described plane can also be grasped in the above-described three-dimensional coordinates.

Also, in the present invention, the approach angle of the above-described chamfering tool may be calculated based on a ratio concerning the chamfer widths at the chamfering points that appear on the above-described plane.

By the way, since the above-described plane passes through the central axis of the inclined hole, the two chamfering points, each of which is located at a symmetrical position to each other with reference to the central axis of the inclined hole, appear on the above-described plane. So, two chamfer widths at these two chamfering points are compared to find the ratio concerning the widths, and then the approach angle of the chamfering tool is calculated based on the ratio. To be concrete, the approach angle of the chamfering tool at which the ratio concerning the chamfer widths at the two chamfering points described above becomes a desired value is determined geometrically, and chamfering is performed based on the approach angle. The above-described chamfer widths are used to designate chamfer widths when viewed in an arbitrary direction on the above-described plane and the direction of view may be determined according to need. That is, according to the present invention, a chamfer width when viewed in an arbitrary direction can be controlled at an arbitrary point where controlling of a chamfer width is required.

Further, in the present invention, the approach angle of the above-described chamfering tool may be set so as to meet an equation $a=b$, where a denotes a chamfer width at one of the two chamfering points appearing on the above-described plane and b denotes a chamfer width at the other chamfering point.

This means that chamfer widths can be made uniform at the chamfering points by setting the approach angle of the above-described chamfering tool so that two chamfer widths at the two chamfering points, which are located at symmetrical positions to each other with respect to the central axis of the inclined hole, become identical.

Further, in the present invention, the above-described member may be a shaft-like member. Desired chamfer widths are processed at the chamfering points of the inclined hole formed on the cylindrical surface of the shaft-like member.

BRIEF DESCRIPTION OF THE DRAWINGS

FIG. 6A is a top view of the chamfer shape when viewed in a direction of a normal N in FIG. 5; and FIG. 6B is a sectional view of the chamfer shape.

FIG. 7A is a perspective view of the pin and the oil hole; FIG. 7B is a view of the pin and the oil hole when viewed in the X axis direction and in the Y axis direction; and FIG. 7C is a sectional view of the pin and the oil hole being cut by a prescribed plane.

FIG. 9A is for the method according to the present invention; and FIG. 9B is for the different method.

FIG. 15A is a shape by the method according to the present invention; and FIG. 15B is a shape by the different processing method.

FIG. 18A is a side view of the pin; and FIG. 18B is a sectional view cutting at a connection portion between the pin and an arm.

DESCRIPTION OF THE PREFERRED EMBODIMENT

Figure 16:
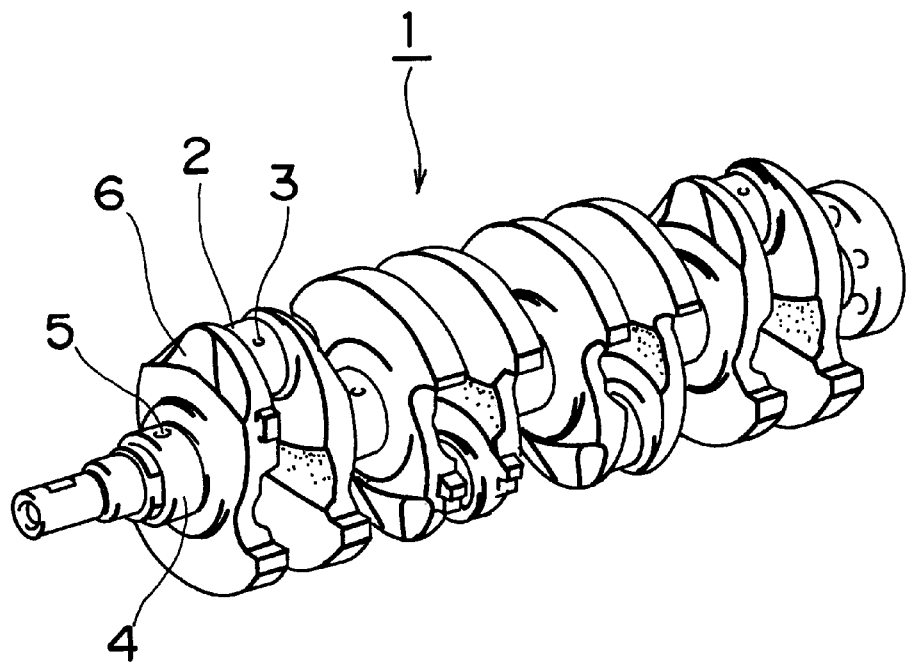
FIG. 16 is a perspective view of the crankshaft.
Figure 17:
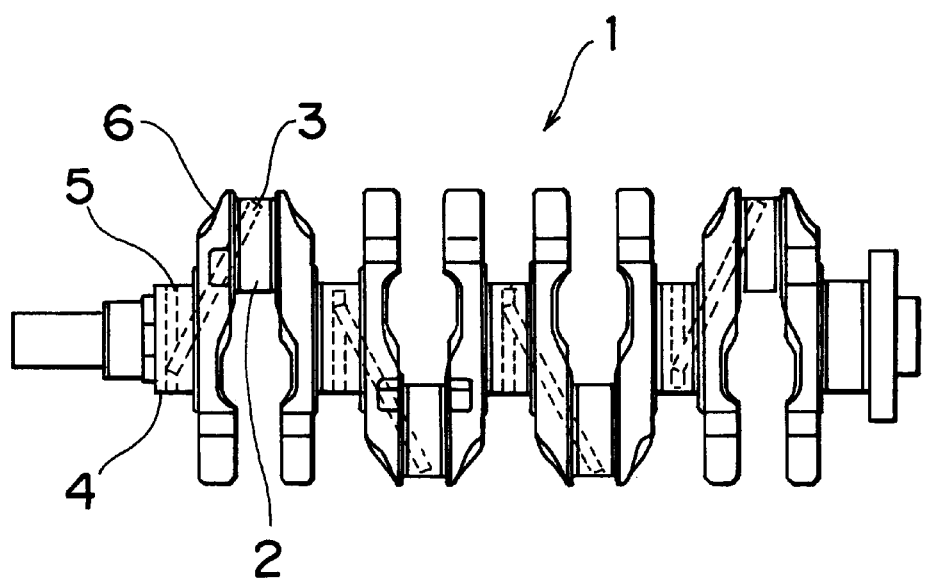
FIG. 17 is a side view of the crankshaft shown in FIG. 16.
Figure 18A:
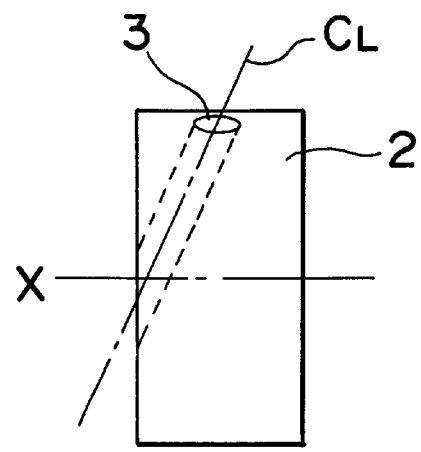
FIG. 18A and FIG. 18B are enlarged views showing the crankshaft shown in FIG. 17.
Figure 18B:
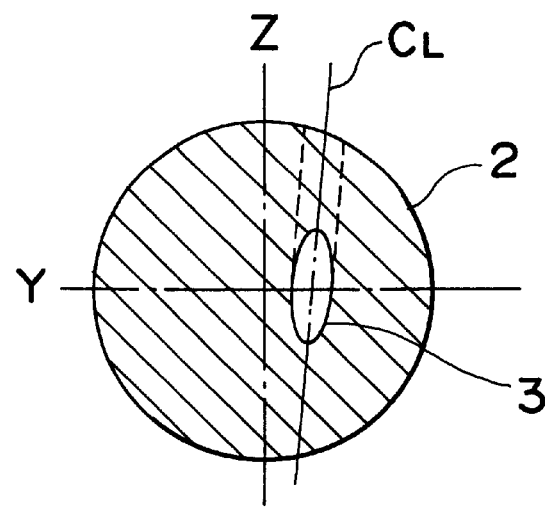

Hereinafter, referring to attached drawings, one embodiment according to the present invention will be described. Here, the same members or portions that are shown in FIG. 16 through FIG. 18 or corresponding members or portions thereof are denoted by the same numerals and detailed description will be omitted.

Figure 1:
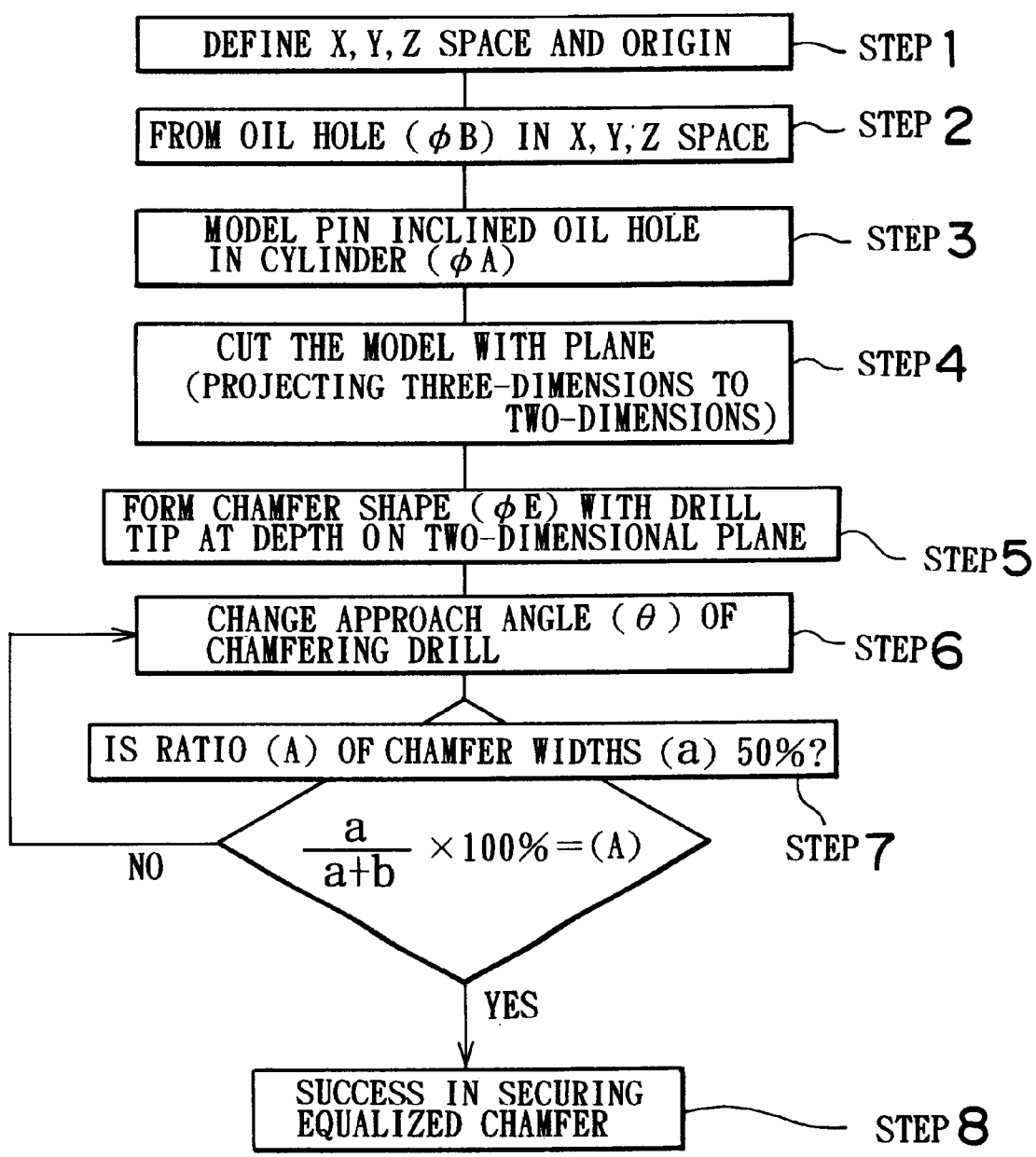
FIG. 1 is a flow chart showing procedures for calculating the approach angle of the chamfering tool is calculated in the chamfering method according to one embodiment of the present invention.

FIG. 1 is a flow chart showing procedures for calculating the approach angle of the chamfering drill in the chamfering method according to the embodiment of the present invention. Also, FIG. 2 through FIG. 6 are explanatory drawings corresponding to respective steps of FIG. 1. In the following, each step shown in FIG. 1 will be described step by step. By the way, in the embodiment according to the present invention, a so-called solid modeler type of 3D-CAD is utilized for the purpose of curtailing a time necessary for calculation.

Figure 2:
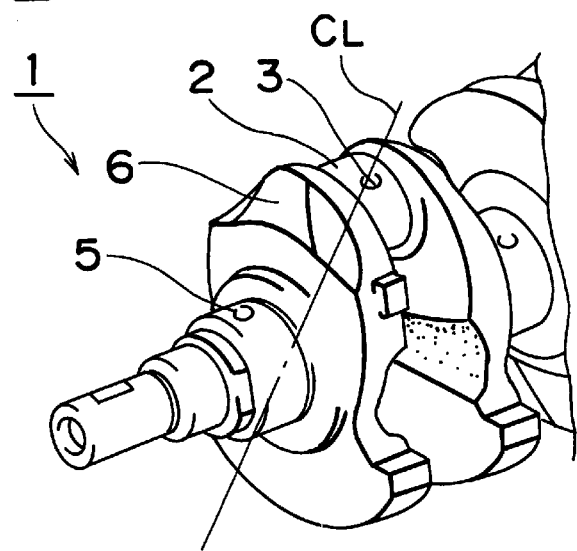
FIG. 2 is a perspective view showing the crankshaft to be processed.
Figure 3:
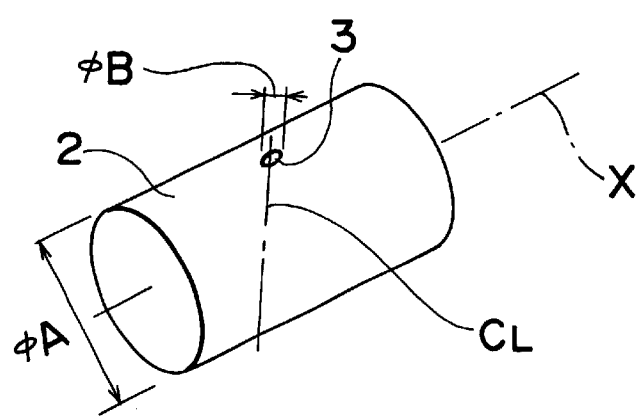
FIG. 3 is an explanatory drawing showing the steps 1 through 3 of FIG. 1.

Further, what is obtained through conducting all the steps described below is the angle of inclination of the chamfering drill for chamfering the oil hole 3 formed in the pin 2 of the crankshaft 1 shown in FIG. 2. This oil hole 3 has double angles as described above. Therefore, the central axis CL of the oil hole 3 is non-parallel to both the axis of the crankshaft 1 and any radial directions of the crankshaft 1.

By the way, in determining the approach angle of the chamfering drill to define the chamfer shape of the oil hole 3, the entire oil hole 3 does not need to be considered but only the vicinity of the surface of the pin 2 at which the oil hole 3 finds its opening needs to be considered. Now, in the following procedures, only the pin 2 and the oil hole 3, which exist in the crankshaft 1 having a complex form, are modeled in a three-dimensional space and the approach angle of the chamfering drill is determined.

First, in the step 1, an X, Y, and Z space and an origin O are defined which serve as a base in determining the approach angle of the chamfering drill.

Next, in the step 2, the oil hole 3 having a diameter $\phi B$ is modeled in the X, Y, and Z space that was defined in the step 1. Although the oil hole 3 is an inclined hole having double angles, position and shape thereof are accurately recognizable in the X, Y, and Z space. In this step, a direction of the shaft center of the pin 2 is set to be in the X axis direction (see FIG. 3).

Next, in the step 3, the pin 2 having a diameter $\phi A$ is modeled so as to overlap the oil hole 3 that was modeled in the step 2. The order of steps 2 and 3 may be in reverse order.

Figure 4:
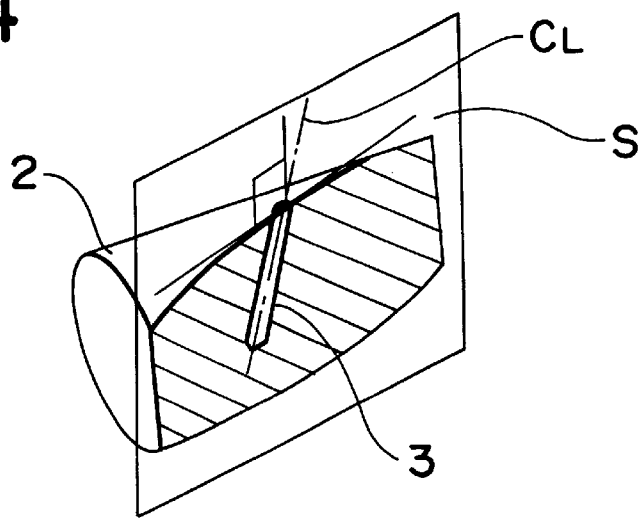
FIG. 4 is an explanatory drawing showing the step 4 of FIG. 1.
Figure 5:
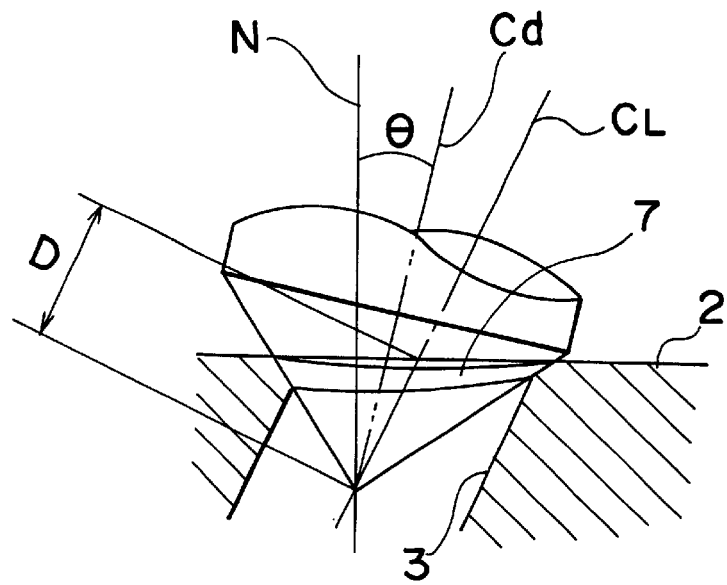
FIG. 5 is an explanatory drawing showing the step 5 of FIG. 1.
Figure 6A:
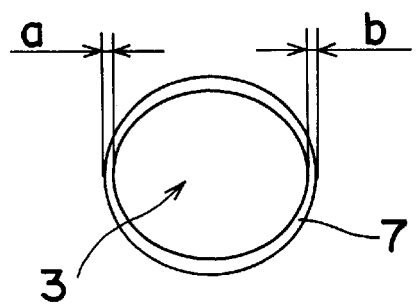
FIG. 6A and FIG. 6B are schematic diagrams showing a shape of the chamfered portion which is obtained in the step 5 of FIG. 1.
Figure 6B:
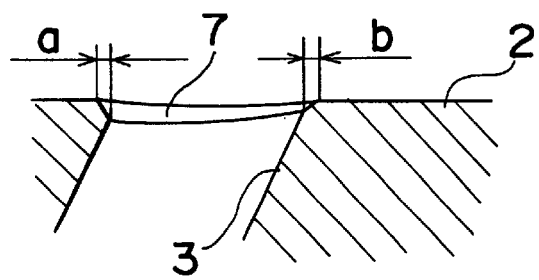

In the step 4, the pin 2 and the oil hole 3 which were modeled in steps 2 and 3 are cut with a plane S which passes through both the central axis CL of the oil hole 3 and the chamfering points as shown in FIG. 4. In the present embodiment, because of a reason described later, as the plane S, a plane that passes through both the central axis of the oil hole and the normal to a tangent of the pin 2 at a point at which the central axis of the oil hole 3 and the surface (cylindrical surface) of the pin 2 intersect is used.

In the step 5, a surface shape of the pin 2 and a cross section of the oil hole 3 appear on the plane S of the step 4. Then, the tip end of the chamfering drill having a diameter $\phi E$ ($\phi E > \phi B$) is overlapped on the pin 2 and the oil hole 3 which appeared on this plane S (see FIG. 5). In consequence, a portion of the surface of the pin 2 with which a drill shape interferes becomes a chamfered portion 7. Here, the length from an intersection of the surface of the pin 2 and the central axis CL of the oil hole 3 to a tip end of the drill is defined as the drill tip end depth D. Also, a shaft axis of the drill is denoted by Cd and a normal to the surface of the pin 2 which passes through the tip end of the drill is denoted by N. By the way, the drill shape shown here is already known by specifications of the drill etc.

Further, in step 6, by changing the approach angle $\theta$ of the chamfering drill, widths a and b in the cross section of the chamfered portion (see FIG. 6) at two of the right and left chamfering points which appear on the plane S are changed. By the way, a direction along which the widths a and b in the cross section of the chamfered portion are measured is a direction parallel to the surface of the pin 2 on the plane S (a direction perpendicular to the normal N).

In step 7, changing the approach angle $\theta$ of the chamfering drill is repeated until the ratio concerning the widths a and b in the cross section of the chamfered portion at two of the right and left chamfering points becomes $[a/(a+b)] \times 100$ (%)=50 (%).

In step 8, chamfering is performed with the approach angle $\theta$ that meets the equation $[a/(a+b)] \times 100(\%)=50(\%)$, namely an equation a=b. As a result, uniform chamfer width at the chamfering points can be secured.

By the way, a reason that the plane which passes through the central axis of the oil hole and also includes the normal to the tangent of the pin 2 at the point at which the central axis of the oil hole and the surface (cylindrical surface) of the pin 2 intersect is used as the plane S is given as follows.

As mentioned above, it is desired that the chamfer widths should be uniform in order to prevent the increase of the dimension along the X axis of the pin 2. Here, by the width of the chamfered portion 7 affecting the dimension along the X axis of the pin 2 meant is a width of the chamfered portion 7 when viewed in a direction of "the normal to the tangent of the pin 2 at the point where the central axis of the oil hole and the surface of the pin 2 (cylindrical surface) intersect." Therefore, a most direct and accurate way of preventing the increase of the dimension along the X axis of the pin 2 is to hold down the width of the chamfered portion 7 when viewed in a direction of the normal. In addition, for the purpose of both preventing a crack caused by stress concentration and retaining the chamfer shape so as to have necessary dimensions after the grinding process, it is required to control the chamfer width when viewed in a direction of the above-described normal. In view of this, as "a width of the chamfered portion 7 when viewed in a direction of the above-described normal" which is a chamfer width at the point where control is required, the widths a and b of the chamfered portion at two of the right and left chamfering points which appear on a cross section when the oil hole 3 is cut with the plane S which passes through both the central axis CL of the oil hole and the above-described normal are examined.

Figure 7A:
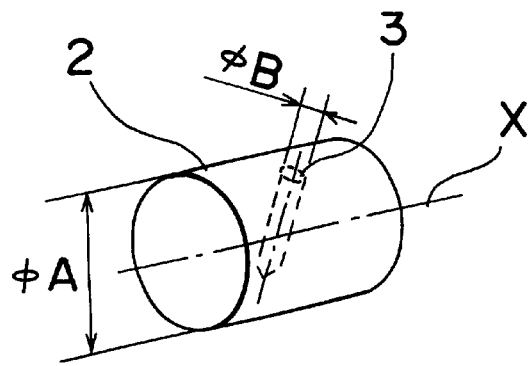
FIGS. 7A, 7B, and 7C are diagrams showing conditions when verifying a relationship between the angle of inclination of the chamfering drill, which is obtained through the procedures shown in FIG. 1, and the width of the chamfered portion by changing parameters.
Figure 7B:
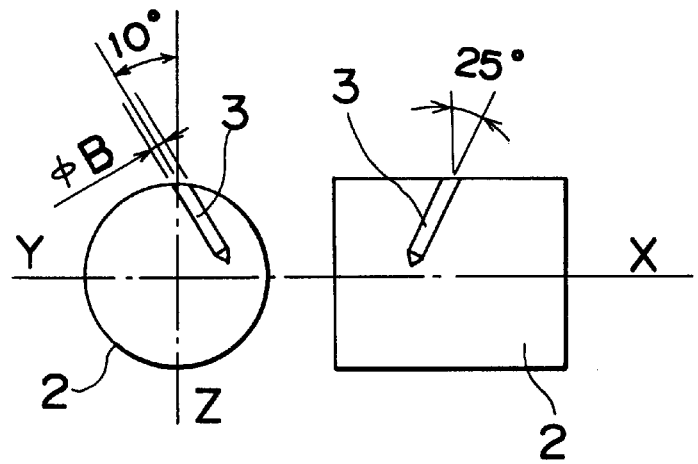
Figure 7C:
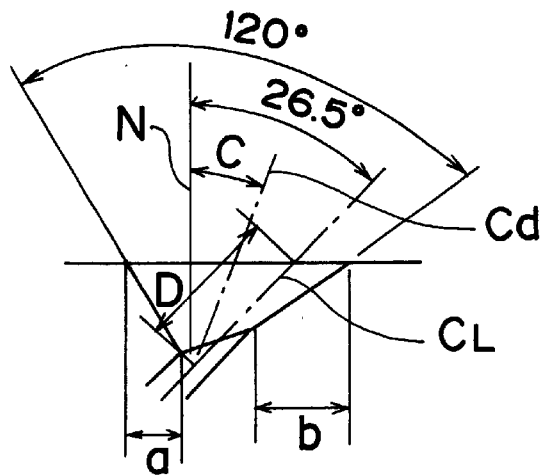

With the chamfering drill set at the angle that has been determined by the procedures explained above, chamfering is performed, thereby the chamfer shape whose dimensions along the X axis of the pin 2 are uniform as well. FIG. 7 and FIG. 8 are illustrations showing an example of examination of a relationship between the angle of inclination of the chamfering drill and the width of the chamfered portion when the oil hole 3 is chamfered by the chamfering method according to the present invention. Processing conditions are: a diameter φA of the pin 2 shown in FIG. 7A is set to be φA=15 mm; and a diameter φB of the oil hole 3 is set to be φB=1 mm or 3 mm. Also, regarding the angle of inclination of the oil hole 3, the angle of inclination viewed from a Y-Z plane is set to be 10° and that viewed from an X-Z plane is set to be 25°. FIG. 7C is a sectional view showing the pin 2 and the oil hole 3 being cut with the plane S. The angle of inclination of the central axis CL of the oil hole 3 with respect to the normal N is 26.5°. Also, an angle C of the central axis Cd of the chamfering drill with respect to the normal N is represented with a ratio (in percent figures) of the angle C to an angle of the central axis CL of the oil hole 3 with respect to the normal N (when C=26.5°, the ratio is 100%). By the way, an angle of the tip of the chamfering drill is 120°. Further, FIG. 8 shows how the ratio concerning the two chamfer widths a and b, $E(\%)=[a/(a+b)]\times 100$, changes when the angle C of the central axis Cd of the chamfering drill is made to change in the range from 0 to 100%.

Figure 8A:
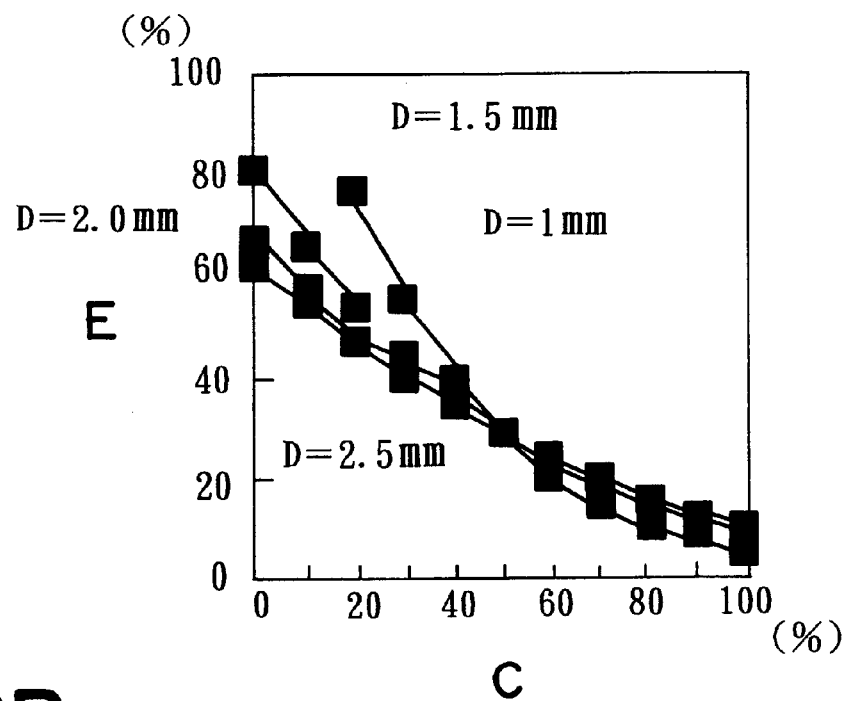
FIG. 8A and FIG. 8B are diagrams both showing results when verifying the relationship between the angle of inclination of the chamfering drill, which is obtained through the procedures shown in FIG. 1, and the width of the chamfered portion by changing parameters.
Figure 8B:
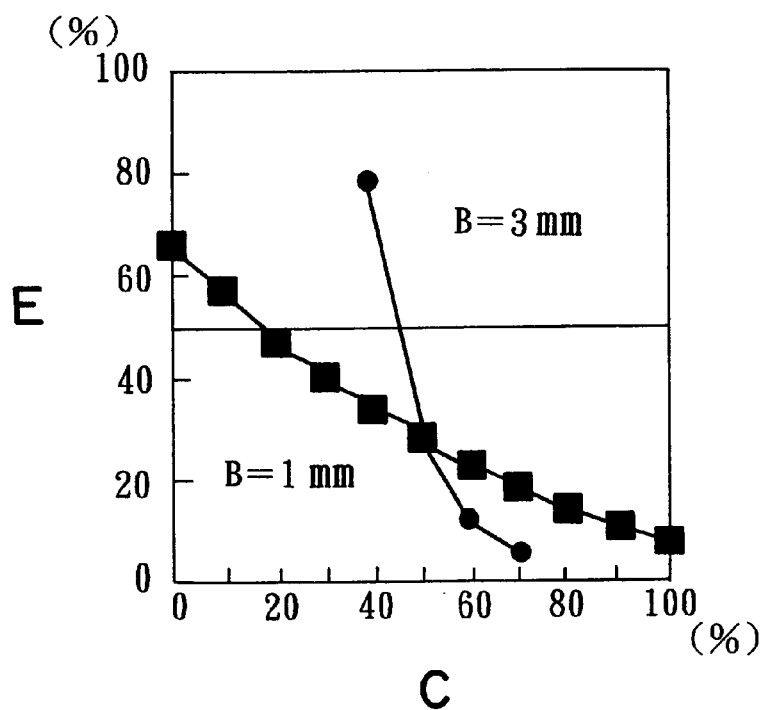

FIG. 8A shows a relationship between E and C when the depth D is changed between 1 mm and 2.5 mm with a diameter φB of the oil hole fixed at 1 mm. FIG. 8B shows a relationship between E and C when the diameter φB of the oil hole is changed to be either 1 mm or 2.5 mm with the depth D fixed at 2 mm. As can be understood from the above results, not only the angle C but also both the diameter φB and the depth D of the oil hole can serve as parameters which affect the ratio E concerning the two chamfer widths a and b. Consequently, it is desirable that the approach angle of the chamfering tool be calculated considering the diameter φB and the depth D of the oil hole.

Effects and results that can be obtained from the embodiment of the present invention which comprises above-mentioned steps are as follows. First, through modeling the pin 2 and the oil hole 3 having double angles to the pin 2 in the X, Y, and Z space (a three-dimensional coordinate system), the shapes and positional relationship of the pin 2 and the oil hole 3 can be easily grasped. On this occasion, it is intended that by modeling such that a direction of the shaft center of the pin 2 agrees with the X axis direction, a dimension of the chamfered portion 7 along the X axis which affects the length of the pin 2 can be easily determined. Following this, in step 4, the pin 2 and the oil hole 3 which have been modeled are cut with the plane S (a plane which passes through the central axis of the oil hole and is parallel to the normal line which passes through the intersection between the central axis of the oil hole and the cylindrical surface). Thereby, the pin 2 and oil hole 3 both of which are originally three dimensional can be recognized in two dimensions. Furthermore, the chamfered portion whose chamfer widths when viewed in a direction of the above-described normal are required to be controlled can be easily grasped on the plane S.

Following this, dimensions of the chamfered portion when viewed in a direction of the above-described normal can be determined geometrically by overlapping the tip of the chamfering drill to the surface profile of the pin 2 and the cross section of the oil hole 3 which had appeared on the plane S in step 5. Then, in the step 6, by changing the approach angle of the chamfering drill, the approach angle θ at which the ratio E concerning a and b is optimized can be determined. Finally, in step 7, if chamfering is performed with the approach angle θ at which the ratio E is equal to 50%, uniform chamfer widths at the chamfering points can be secured.

By the way, the approach angle θ of the chamfering drill is strictly an angle on the plane S. However, since the pin 2 and the oil hole 3 are modeled in the X, Y, and Z space in steps 1 through 3, the position of the plane S can be grasped in the above-described X, Y, and Z space. Consequently, it is only natural that the approach angle θ of the chamfering drill on the plane S can be grasped in the above-described X, Y, and Z space. By virtue of this fact, the approach angle θ can be easily used to set an angle of the chamfering drill.

Also, in the embodiment according to the present invention, the pin 2 and the oil hole 3 are cut with the plane S which passes through both the central axis CL of the oil hole 3 and the normal of the cylindrical surface of the pin 2, and widths a and b of the chamfered portion at two chamfering points on right and left which appear on this cross section are examined. This means, in other words, that the widths of the chamfered portion 7 are viewed in a direction in which the chamfer widths are required to be controlled. Therefore, the widths of the chamfered portion 7 in the direction in which the control is required can be examined directly. Consequently, it becomes easy to keep down the dimensions of the pin 2 in a design phase of the crankshaft resulting in a shortened total length of the crankshaft. Hence the present invention can make a direct contribution to making an engine more compact and lightweight. Also, through making the widths of the chamfered portion 7 uniform when viewed in said direction, the present invention also have a good effect on prevention of a crack caused by stress concentration during quenching. Further, even if the cylindrical surface of the pin 2 is ground, the widths of the chamfered portion 7 decrease uniformly all around its periphery, so that it is easy to leave the chamfer shape having necessary dimensions after the grinding process is performed.

By the way, a direction in which the widths a and b of the chamfered portion are viewed on the plane S is not necessarily limited to be the direction of the normal N (FIG. 5), but can be determined arbitrarily according to need.

Therefore, according to the present embodiment, the chamfer widths when the chamfering points are viewed in an arbitrary direction can also be controlled.

In the embodiment according to the present invention, the invention was described taking the pin 2 of the crankshaft 1 as an example of a member which forms an inclined hole having double angles and also taking as an example the oil hole 3 of the inclined hole. However, the present invention can be applied to other subjects, for example, to a case where chamfering is performed on the inclined hole having double angles formed in a member other than a shaft-like member (sphere etc.). Also, it is natural that the present invention can be applied to a case where chamfering is performed on the inclined hole having a single angle (an inclined hole which is parallel to at least one reference axis of the member).

As a feature of the present invention, a fact can be pointed out that the approach angle of the chamfering tool is calculated on the plane which passes through both the central axis of the inclined hole and the chamfering points. Regarding an effect that can be obtained by this feature, the inventors have carried out verification as follows. In the following, the results of its verification are explained taking as an example a case where the oil hole 3 of the pin 2 of the crankshaft is chamfered.

Figure 9A:
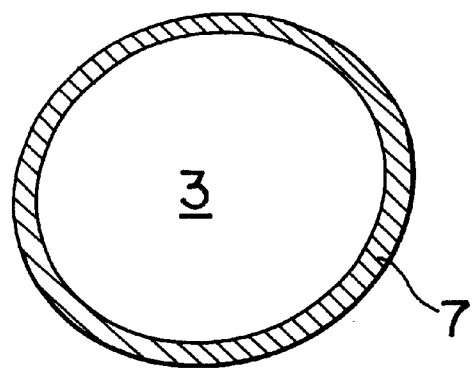
FIG. 9A and FIG. 9B are views showing a chamfered portion which was chamfered by the method according to the present invention and a chamfered portion which was chamfered by a different processing method, respectively, when viewed in a direction of the normal to the cylindrical surface of the pin 2.
Figure 9B:
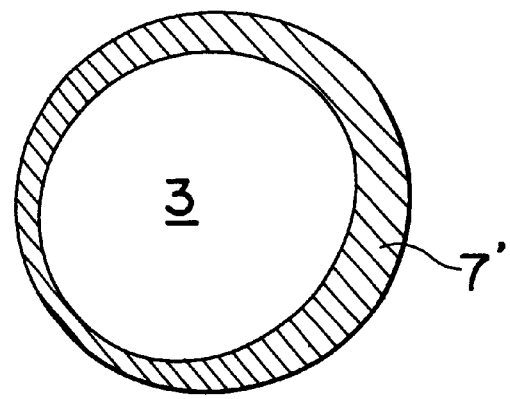

FIG. 9 shows two chamfered portions 7 and 7' which were chamfered by two kinds of processing methods when viewed in a direction of the normal to the cylindrical plane of the pin. The chamfered portion 7 shown in FIG. 9A is formed by the method according to the present invention. The chamfered portion 7 is formed almost uniformly all around the periphery of the oil hole 3. On the contrary to this, the chamfered portion 7' shown in FIG. 9B is a chamfer shape for a case where chamfering is performed with the chamfering drill translated in parallel by a necessary amount, keeping the shaft center Cd (see FIG. 5) of the chamfering drill parallel to the central axis CL (see FIG. 5) of the oil hole 3 (that is, the approach angle of the chamfering tool is not considered). One can understand that the chamfered portion 7' of FIG. 9B is non-uniform.

Figure 10:
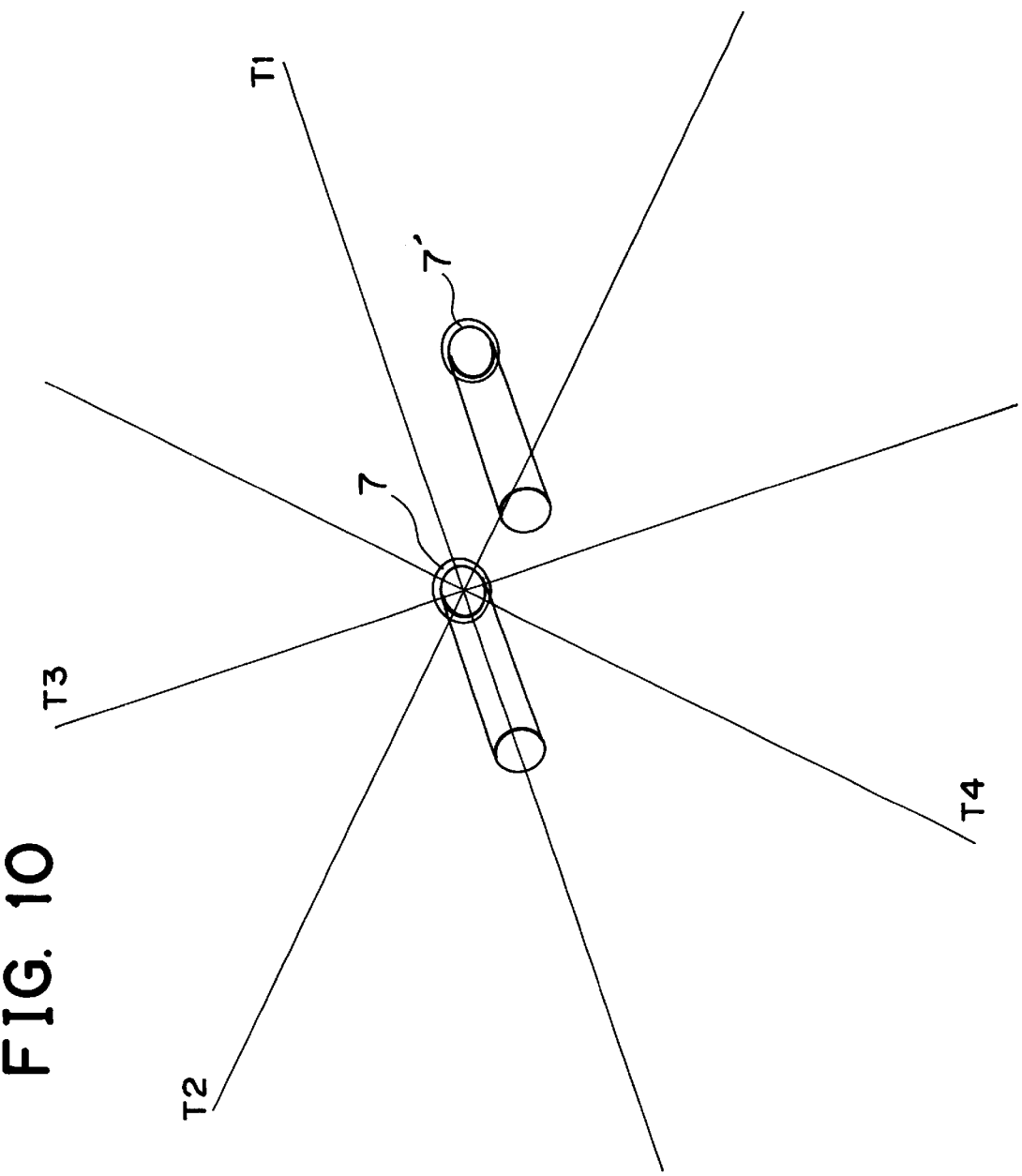
FIG. 10 is a diagram showing cutting lines for viewing cross sections of the two chamfered portions shown in FIG. 9.

Here, regarding shapes of the chamfered portions 7 and 7' shown in FIG. 9, sectional views thereof taken along lines T1, T2, T3, and T4 indicated in FIG. 10 are shown in FIG. 11 through FIG. 14. Further, in FIG. 10, the lines T1 to T4 are indicated only for the chamfered portion 7. However, a viewer of the figure is expected to understand that the chamfered portion 7' is also cut at the similar positions.

Figure 11:
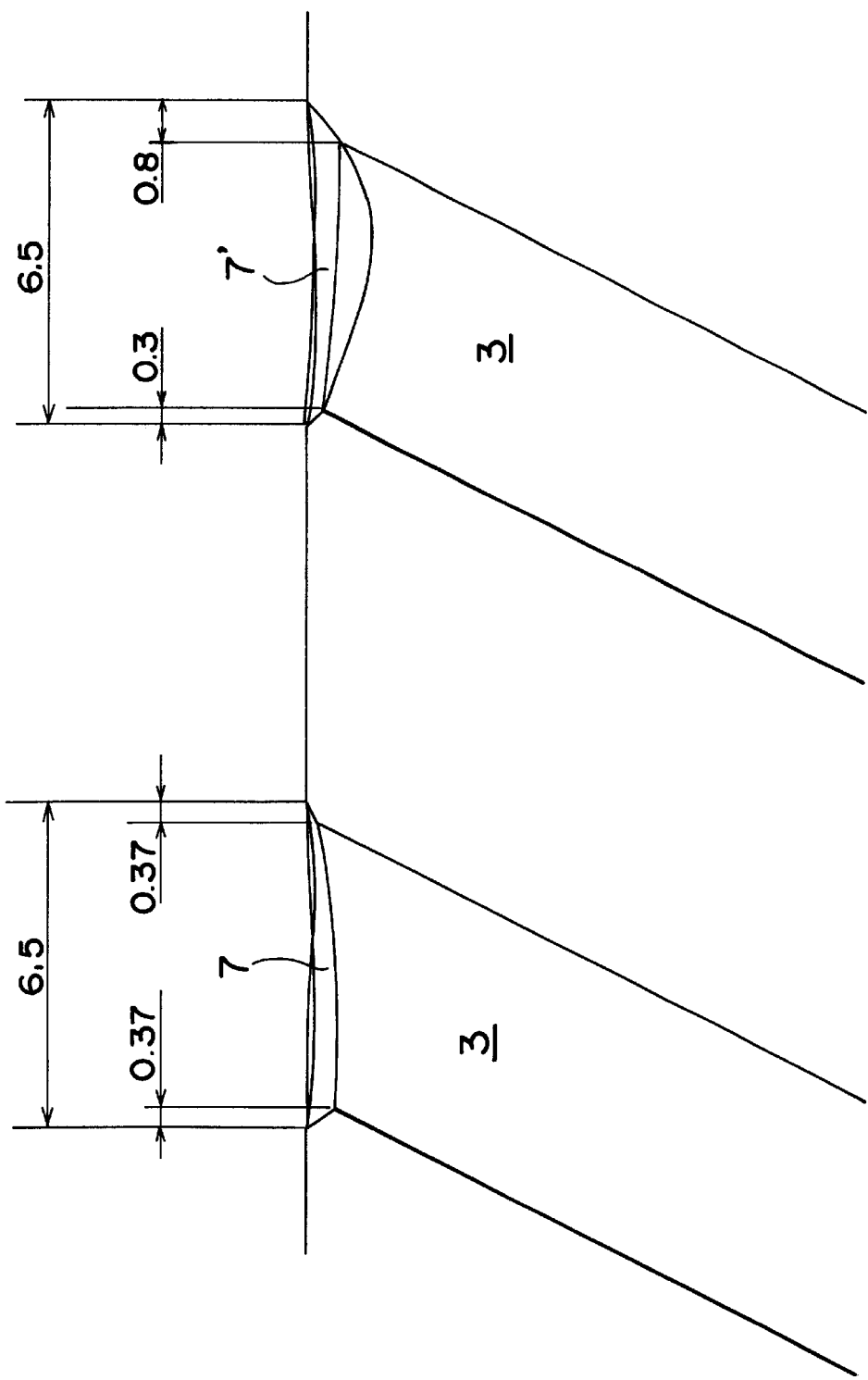
FIG. 11 is a sectional view of the two chamfered portions, shown in FIG. 9, which were cut by line TI in FIG. 10.

First, FIG. 11 shows a sectional view of the two chamfered portions 7 and 7' taken along the line T1. The line T1 is obtained by cutting the oil hole 3, which appears as an elliptical opening on the cylindrical surface of the pin 2, along the major axis. At each of the chamfered portions 7 and 7', a maximum diameter thereof is 6.5 mm. The chamfer widths of the chamfered portion 7 are both 0.37 mm for the right and left chamfering points. On the other hand, the chamfer widths of the chamfered portion 7' are 0.3 mm for the left chamfering point and 0.8 mm for the right one.

Figure 12:
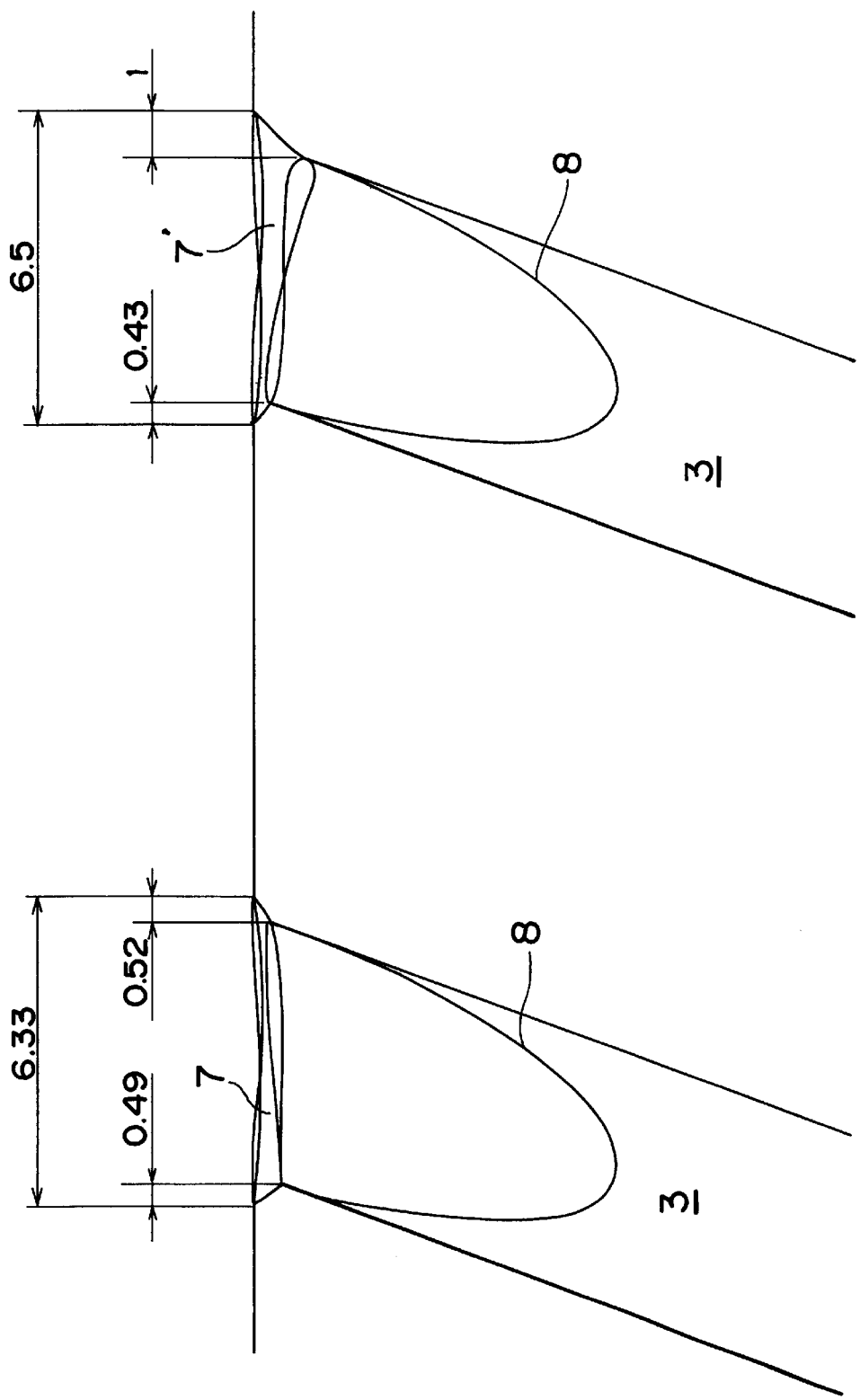
FIG. 12 is a sectional view of the two chamfered portions, shown in FIG. 9, which were cut by line T2 in FIG. 10.

FIG. 12 shows sectional views of the two chamfered portions 7 and 7' taken along the line T2. By the way, lines designated with a numeral 8 in the figure represent the cutting lines of the oil holes 3 which actually appear on the cutting plane when the oil hole 3 of the pin 2 is cut by a plane passing through the line T2. In FIG. 12, a maximum diameter of the chamfered portion 7 is decreased to 6.33 mm, whereas the chamfer widths for the right and left chamfering points are maintained almost uniform, being 0.49 mm for the left chamfering point and 0.52 mm for the right one. On the other hand, a maximum diameter of the chamfered portion 7' remains 6.57 mm, showing no change, and the chamfer widths are 0.43 mm for the left chamfering point and 1 mm for the right one, respectively.

Figure 13:
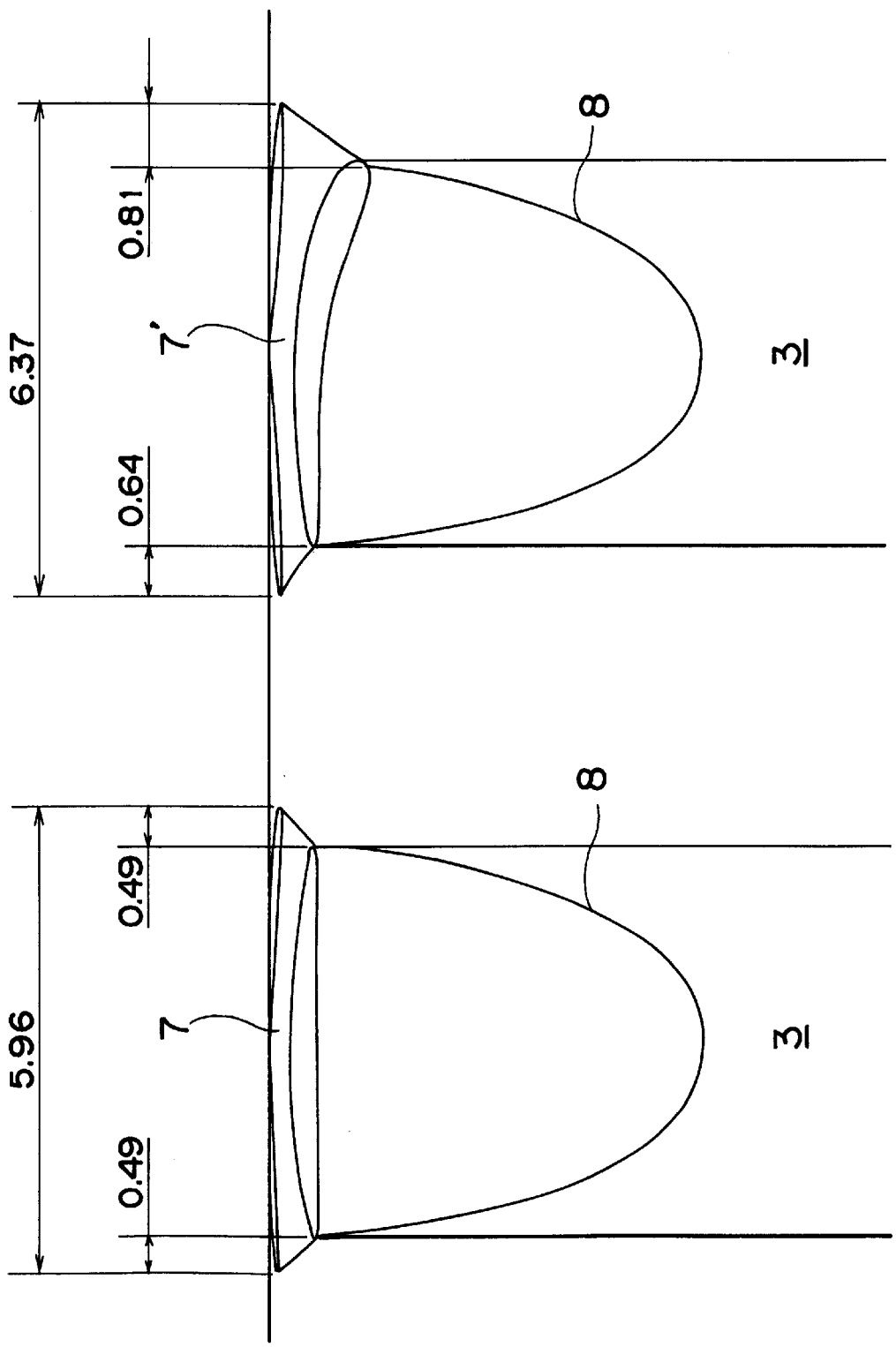
FIG. 13 is a sectional view of the two chamfered portions, shown in FIG. 9, which were cut by line T3 in FIG. 10.

FIG. 13 shows sectional views of the two chamfered portions 7 and 7' taken along the line T3. At this time, a maximum diameter of the chamfered portion 7 was decreased to 5.96 mm, but the chamfer widths are 0.49 mm for both the left and right chamfering points. On the other hand, a maximum diameter of the chamfered portion 7' was decreased to 6.37 mm, and the chamfer widths are 0.64 mm for the left chamfering point and 0.81 mm for the right, respectively.

Figure 14:
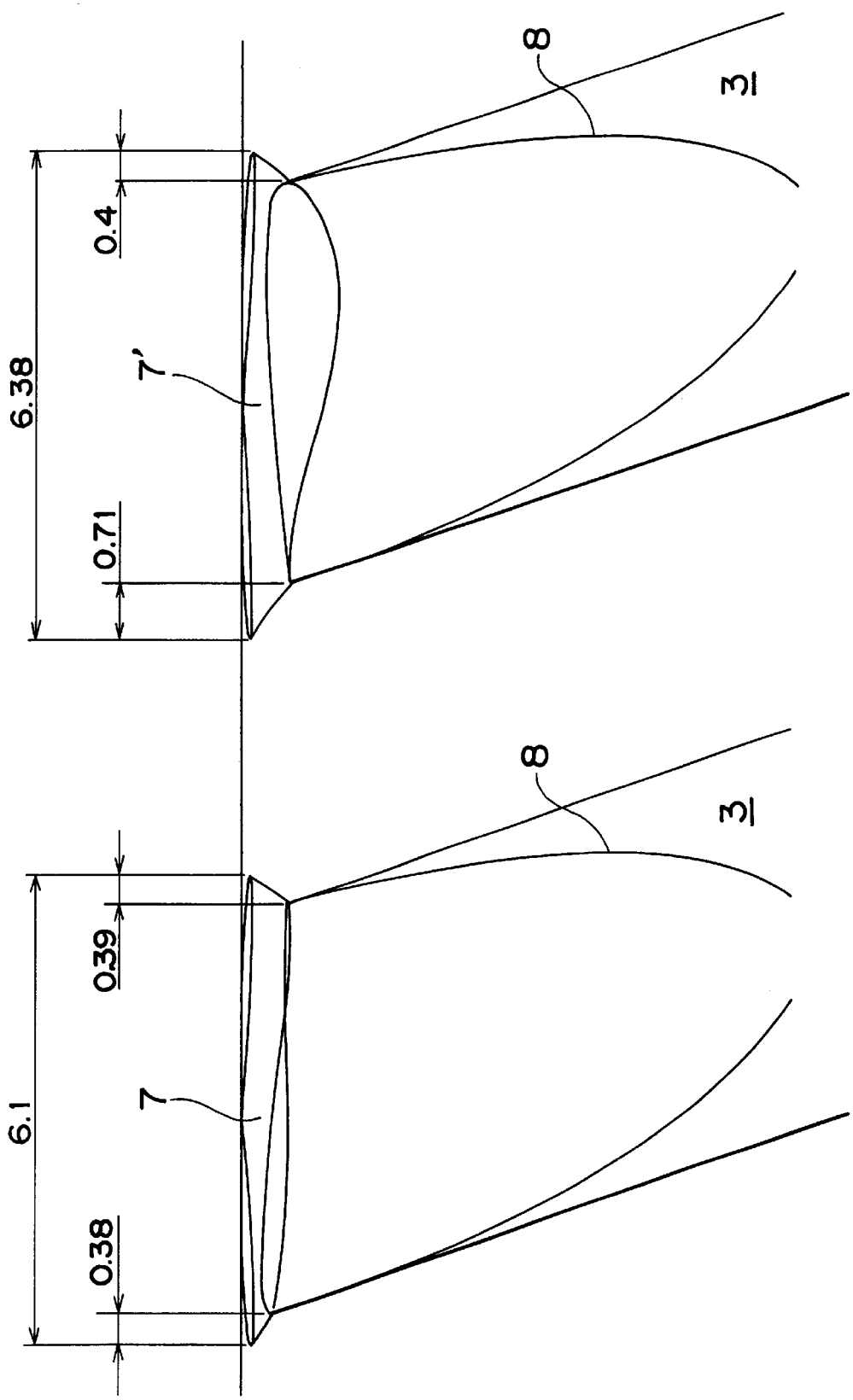
FIG. 14 is a sectional view of the two chamfered portions, shown in FIG. 9, which were cut by line T4 in FIG. 10.

FIG. 14 shows a cross section of the two chamfered portions 7 and 7' taken on the line T4. A maximum diameter of the chamfered portion 7 is 6.1 mm, and the chamfer widths are 0.38 mm for the left chamfering point and 0.39 mm for the right one, respectively, almost maintaining uniformity. On the other hand, a maximum diameter of the chamfered portion 7' is 6.38 mm, and the chamfer widths are 0.71 mm for the left chamfering point and 0.4 mm for the right, respectively.

Figure 15A:
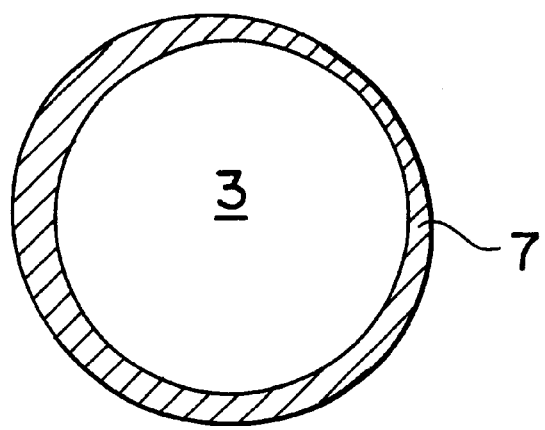
FIG. 15A and FIG. 15B are views showing shapes of the two chamfered portions, when viewed in a direction of the central axis of the oil hole.
Figure 15B:
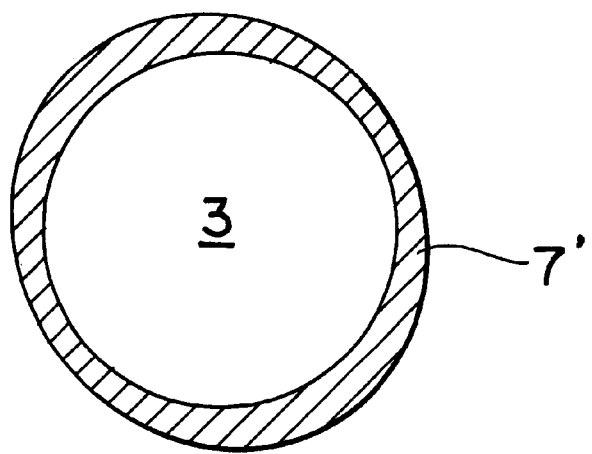

Now, FIG. 15 shows shapes of the two chamfered portions 7 and 7' when viewed in a direction of the central axis CL of the oil hole 3. Viewing in this direction, the chamfered portion 7' shown in FIG. 15B is formed almost uniformly all around the periphery of the oil hole 3, whereas the chamfered portion 7 shown in FIG. 15A by the method according to the present invention is formed non-uniformly.

As in this case, in the case where chamfering is performed with the chamfering tool translated in parallel by a necessary amount while parallelism between CL and Cd is maintained, the chamfer widths when viewed in a direction of the central axis CL of the oil hole 3 become almost uniform, whereas the chamfer width when viewed in a direction of the normal to the cylindrical surface of the pin 2 becomes non-uniform. Accordingly, if a case is considered wherein a diameter of the pin is reduced by the grinding process after the quenching, there is a fear that a portion of the chamfered portion 7' should disappear. To prevent a portion of the chamfered portion from disappearing after the grinding process, the chamfering drill is required to be inserted into the inclined hole to a deeper position so that a position having smallest chamfer width is processed to have necessary dimensions of chamfer or more. Consequently, chamfering is performed in excessive dimensions on the whole; therefore, the problem of conventional technologies pertaining to the present invention cannot be solved.

As can be understood from the foregoing, it is extremely effective in solving a problem pertaining to the present invention that the approach angle of the chamfering tool is calculated on the plane that passes through both the central axis of the inclined hole and the chamfering points.

What is claimed is:

1. A method for chamfering a periphery of an opening of an inclined hole formed in a member, comprising:

calculating an approach angle of a chamfering tool, wherein the approach angle lies in a plane which contains both a central axis of said inclined hole and a normal to a tangent to the member which passes through a point of intersection of said central axis of said inclined hole and an outer surface of the member; and chamfering said opening periphery by aligning the chamfering tool along the calculated approach angle and causing the chamfering tool to cut said chamfer to a desired depth.

2. A method for chamfering according to claim 1;
wherein the approach angle of said chamfering tool is calculated to provide a desired ratio of a width of the chamfer along each of two intersections of said plane with said chamfer.

3. A method for chamfering according to claim 2;
wherein the approach angle of said chamfering tool is set so that said chamfer widths are equal.

4. A method for chamfering according to claim 1;
wherein said member is a cylindrical member.

5. A method for chamfering according to claim 4;
wherein said member is a solid cylindrical member.

6. A method for chamfering according to claim 5;
wherein the approach angle of said chamfering tool is set so that said chamfer widths are equal.

7. A method for chamfering a periphery of an opening of an inclined hole having double angles formed in a member, comprising:

modeling said member and its inclined hole in a three-dimensional coordinate system;

modeling the two-dimensional intersection of said member and said inclined hole with a plane containing both a central axis of said inclined hole and a normal to a tangent to the member which passes through a point of intersection of said central axis of said inclined hole and an outer surface of the member;

determining an approach angle of a chamfering tool to obtain a desired shape of a chamfer, wherein the approach angle lies in said plane, and the calculation of the desired chamfer geometry is performed by reference to said two-dimensional models of the intersection of said member and said inclined hole with said plane; and performing the chamfering operation by aligning the chamfering tool along the determined approach angle and causing the chamfering tool to cut said chamfer to a desired depth.

8. A method for chamfering according to claim 7;
wherein the approach angle of said chamfering tool is calculated to provide a desired ratio of a width of the chamfer along each of two intersections of said plane with said chamfer.

9. A method for chamfering according to claim 8;
wherein the approach angle of said chamfering tool is set so that said chamfer widths are equal.

10. A method for chamfering according to claim 7;
wherein said member is a cylindrical member.

11. A method for chamfering according to claim 10;
wherein said member is a solid cylindrical member.

12. A method for chamfering according to claim 11;
wherein the approach angle of said chamfering tool is set so that said chamfer widths are equal.

13. A method for chamfering according to claim 5;
wherein the approach angle of said chamfering tool is set to provide a desired ratio of a width of the chamfer along each of two intersections of said plane with said chamfer.

14. A method for chamfering according to claim 11;
wherein the approach angle of said chamfering tool is calculated to provide a desired ratio of a width of the chamfer along each of two intersections of said plane with said chamfer.

* * * * *